United States Patent Office 2,715,219
Patented Aug. 9, 1955

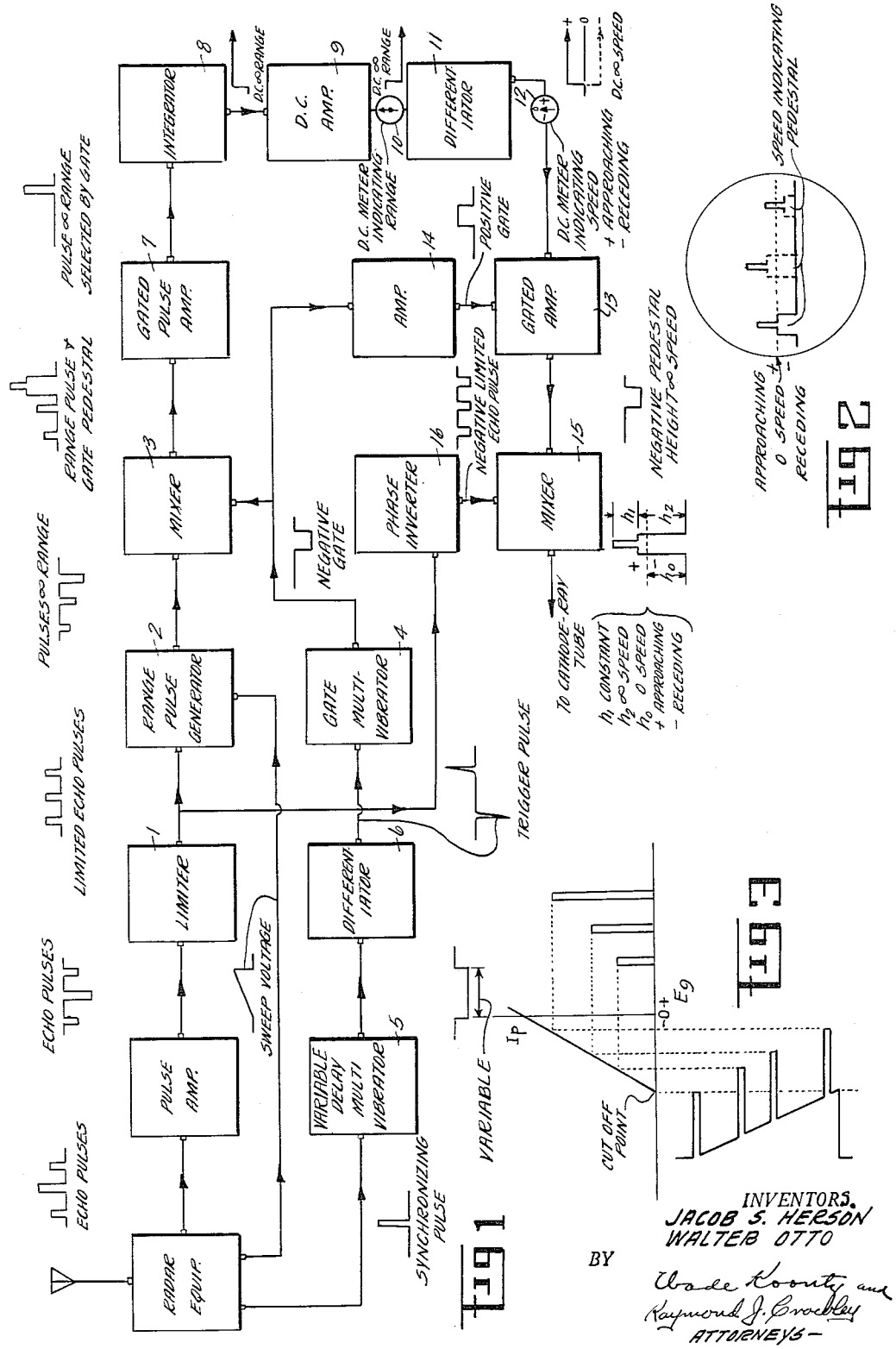

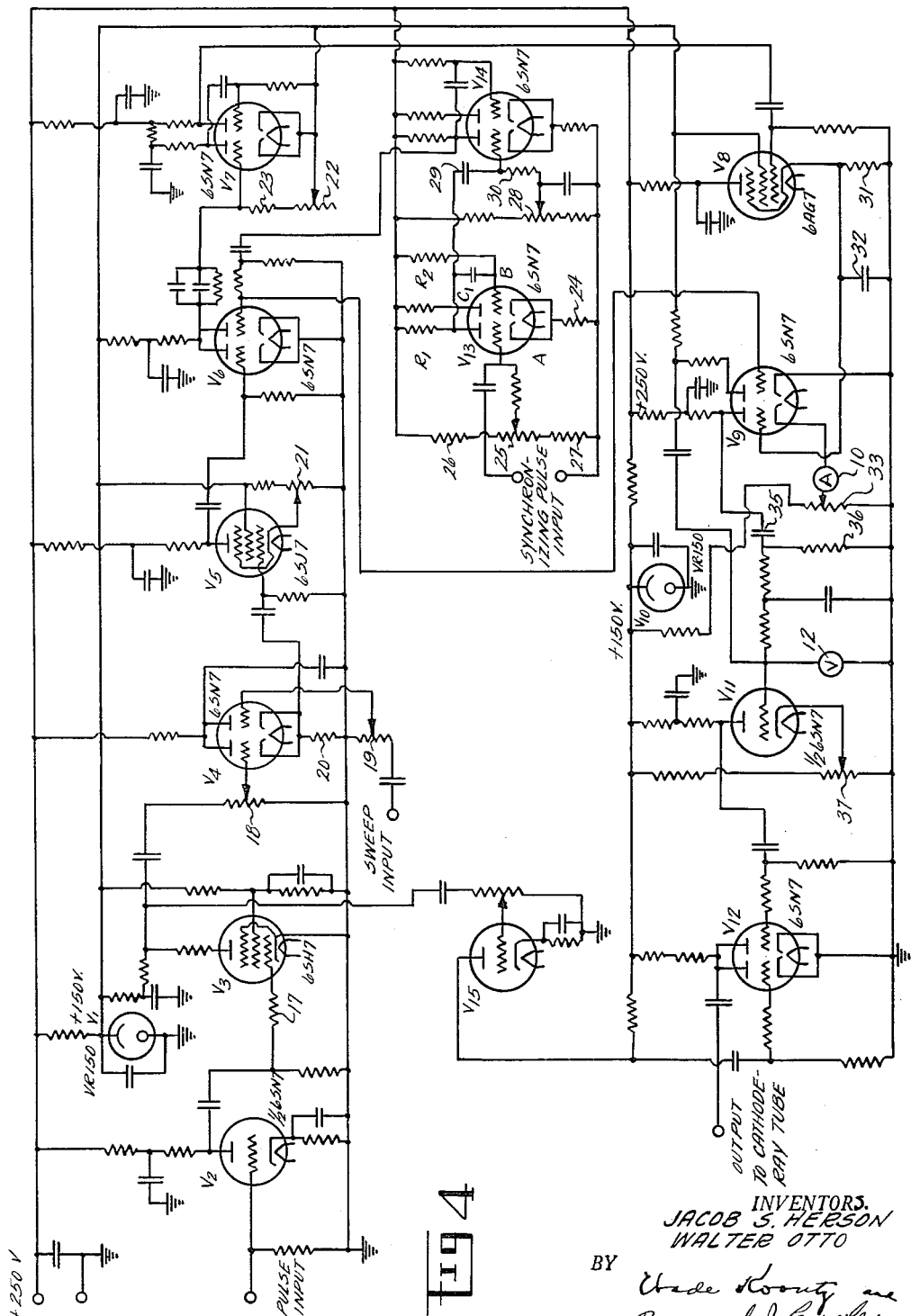

2,715,219

COMBINED RADAR RANGE AND SPEED INDICATOR

Walter Otto and Jacob S. Herson, Dayton, Ohio

Application September 12, 1946, Serial No. 696,384

3 Claims. (Cl. 343—8)

(Granted under Title 35, U. S. Code (1952), sec. 266)

The invention described herein may be manufactured and used by or for the Government for governmental purposes without the payment of any royalty thereon.

In conventional radar systems using a deflection modulated cathode ray tube oscilloscope as an indicator, the range of the target is indicated on a cathode ray tube screen by the position of the deflection "pip" on the base line, the amplitudes of the "pips" varying with the strength of the respective echo pulses. The speed of the target with respect to the speed of the observation aircraft is not indicated and can only be estimated by observing the motion of the "pip" along the base line over a relatively long period of time. Frequently, as in stress of combat, it is desirable to have a much more rapid combined indication of speed and range on a calibrated instrument.

It is, therefore, an object of this invention to provide a novel radar indicating system which combines range and rate of change of range (speed) in a single indicator.

Another object is to provide a radar indicating system for operation in conjunction with conventional radar equipments.

A further object is to provide a system for converting reflected pulses into pulses the amplitudes of which are proportional to the range of respective radar targets.

A still further object is to provide a system for converting reflected pulses into pulses the amplitudes of which are proportional to speed of a given radar target.

Other objects and features of novelty will become apparent from the following description and the annexed drawings, it being clearly understood, however, that the invention is not limited in any way by such description and drawings or otherwise than by the appended claims.

In the drawings in which like reference numerals refer to like parts:

Fig. 1 is a functional block diagram illustrating the interconnection and functions of the various circuit components of the present invention;

Fig. 2 is a visual presentation on a cathode ray tube screen of received echo pulses from a given target, said pulses being superimposed upon range gating pedestals, the relative height of the pedestal pulses with respect to a predetermined zero reference point on the calibrated screen of the cathode ray tube indicating the speed of approach or recession of the target aircraft with respect to the radar system, the range of the target being indicated on the calibrated cathode ray tube screen base line by the time of occurrence of the received echo pulses with respect to the beginning of the sweep voltage;

Fig. 3 is a plate current-grid voltage characteristic curve of the vacuum tube employed in the range pulse generator circuit of this invention illustrating the effect of the superposition of the limited echo pulses on the coacting radar sweep voltage for obtaining pulses whose amplitudes are proportional to the time of occurrence of the received echo pulses with respect to the beginning of the sweep voltage, and therefore proportional to the range of the radar target; and Fig. 4 is a schematic circuit diagram of this invention.

Reference is made to Figs. 1, 2 and 3 of the drawings for the operational description of this invention. As previously stated, this invention operates in conjunction with conventional radar systems utilizing cathode ray tube oscilloscopes as indicators. Such conventional radar systems, as is well known in the art, furnish a sweep voltage which provides the linear time base for the cathode ray tube and a synchronizing pulse voltage at the beginning of each sweep of the sweep voltage. The video echo pulses derived from the coacting radar equipment which represent reflections from targets "seen" by the radar indicator (cathode ray tube) are applied to the limiter circuit 1 of Fig. 1 of this invention. The function of the limiter is to convert all received echo pulses into pulses of the same amplitude regardless of their amplitudes when received. The output pulses of limiter 1 and the sweep voltage from the radar transmitter are fed into range pulse generator circuit 2, the limiter output being also fed to the output circuit (speed modulated pulse generator) the function of which will hereinafter be fully described. The range pulse generator 2 converts the received echo pulses into pulses of the same time relationship as the received pulses but of amplitudes proportional to the range of the target so that pulses corresponding to near targets are of lower amplitude than those pulses which correspond to targets which are more distant from the observation aircraft. The manner in which the foregoing operation is accomplished may be seen by reference to Fig. 3. The bias of the range pulse generator tube and the amplitude of the sweep voltage applied thereto are so adjusted that the maximum value of the sweep voltage just brings the tube to, or a little below, cut-off. Also the amplitude of the echo pulses applied to the tube is adjusted to such a value that for zero range the pulse just brings the tube to cut-off. Several pulses, including one at zero range, are shown superimposed on the sweep voltage in this figure. The combined effect of the sweep voltage and each of the received echo pulses is the production of a pulse whose amplitude is proportional to the time of occurrence of the echo pulses with respect to the beginning of the sweep, and, therefore, whose amplitude is proportional to the range of the target.

The output pulses of range pulse generator 2 are fed into mixer-amplifier circuit 3 to which is also applied a movable gating pulse generated by gate multivibrator 4. The time of occurrence of the gating pulse is controlled by the delay multivibrator 5. This multivibrator is triggered by a synchronizing pulse obtained from the radar equipment and produces in its output circuit a delay pulse of controllable length. The delay pulse is passed through differentiating circuit 6 and the resulting sharp pulse produced by the trailing edge used to trigger gate multivibrator 4. By controlling the length of the delay pulse, the gate may be made to occur at the time of any echo pulse. The pulses having amplitudes proportional to range and the gating pulse appearing in the output circuit of mixer 3 are applied to the input circuit of gated pulse amplifier 7. This amplifier is biased beyond cut-off by an amount equal to the gating pulse. The amount by which the bias exceeds cut-off should also be slightly greater than the amplitude of the maximum echo pulse in order to prevent operation of amplifier 7 by any pulse other than the one selected by the gate.

There will appear in the output circuit of gated amplifier 7 a series of pulses representing echos from the target selected by the gate and having amplitudes proportional to the range of the target. The pulses are applied to integrator stage 8 which has a direct current output proportional to the peak values of the pulses applied to the input. The output of integrator 8 is amplified by direct current amplifier 9, the output circuit of which contains direct current meter 10 calibrated to indicate range.

The function of differentiator 11 is to produce a voltage proportional to the rate of change of range or, in other words, to speed. The output of amplifier 9 is constant if the range does not change and increases or decreases if the range increases or decreases. Hence the output of the differentiating circuit is a voltage that for no change in range (zero speed) is zero and for a changing range has an amplitude proportional to the rate of change (speed) and is positive or negative depending on whether the range is decreasing or increasing. A D. C. voltmeter 12 may be connected across the output terminals of the differentiating circuit to show this information.

The speed voltage from the differentiating circuit and also the gate from multivibrator 4 are applied to gated amplifier 13. This stage is biased beyond cut-off by an amount exceeding the maximum speed voltage that will be applied. The gate, by means of amplifying stage 14, is adjusted to give a convenient output for the gated amplifier. The output of this stage therefore is a pedestal of the same duration as the gate and having an amplitude that varies with speed. This pedestal is combined with the limited echo pulses from limiter 1 in the mixer 15. In order to have the polarities of the pulse and pedestal the same, it is necessary to insert phase inverter 16 to reverse the phase of the pulses. The output of stage 15 is a pedestal of variable amplitude indicating speed with a constant amplitude pulse riding on top. Application of this signal to a cathode-ray indicator of the A-scan type produces an indication as shown in Fig. 2. By adjusting the delay produced by multivibrator 5, the speed pedestal may be made to coincide with any echo pulse on the screen thus indicating the speed of the corresponding target relative to the radar set and also giving information as to whether the target is approaching or receding. A horizontal line may be placed on the screen of the cathode-ray tube to indicate the height of the pedestal for zero speed. The actual speed of the target will then be proportional to the departure of the pedestal top up or down from the zero line. A pedestal a given distance above the zero line indicates a target approaching at a certain speed relative to the radar set, whereas a pedestal the same distance below the zero line indicates a target having the same relative speed but moving in the opposite direction.

Referring to Fig. 4, which shows a schematic circuit diagram of the range and speed indicator, positive echo pulses from the radar equipment are amplified by conventional pulse amplifier stage $V_2$ and the resulting negative pulses applied to limiter stage $V_3$. The negative pulse output of $V_2$ is of such amplitude that, for any echo of usable strength, limiter $V_3$ is operated from its quiescent state to plate current cut-off, thus producing at the plate of $V_3$ a positive output of constant amplitude regardless of the variations in the input signal strength. The resistor 17, in series with the control grid, is for the purpose of minimizing the effect of signals of positive polarity due to noise or jamming.

Tubes $V_4$ and $V_5$ constitute the range pulse generator of Fig. 1. Limited echo pulses from $V_3$ are applied through adjustable potentiometer 18 to the control grid of one section of mixer tube $V_4$, which is a dual-triode. Sweep voltage from the radar system is applied to the control grid of the other section through adjustable potentiometer 19. The plates and also the cathodes of the two sections are connected together and the output load resistor 20 is connected between the cathodes and ground causing the stage to operate as a cathode follower. The voltage across resistor 20, which is the sum of the limited pulse and sweep voltage, is applied to the control grid of tube $V_5$. The amplitudes of the pulse and sweep voltage applied to the grid of tube $V_5$, and the bias on this tube, are adjusted by potentiometers 18, 19 and 21 respectively to obtain operation of the tube in accordance with Fig. 3, as previously explained.

The output pulses of tube $V_5$, which are pulses having amplitudes proportional to range, are applied to the control grid of one section of mixer tube $V_6$. To the control grid of the other section is applied a movable gating voltage generated by the multivibrator employing tube $V_{14}$. The two anodes of $V_6$ are connected together as are also the two cathodes. The range pulses and gate appearing in the output circuit of $V_6$ are applied to the gated pulse amplifier, which is a two stage amplifier employing both sections of the dual-triode $V_7$. Bias for the left hand section is provided by the potential drop across adjustable resistor 22 and fixed resistor 23. The bias is adjusted to a value exceeding the cut-off voltage of the tube by an amount equal to the gate, as explained in connection with Fig. 1. The output of the gated amplifier is zero until the gate is adjusted to coincidence with the range pulse of a given target whereupon this pulse appears in the output circuit to the exclusion of all other range pulses outside the gate.

Tubes $V_{13}$ and $V_{14}$ are employed in multivibrator circuits, the purposes of which have already been explained in connection with Fig. 1. The multivibrator employing $V_{13}$ is for introducing a delay in triggering the gate multivibrator and its operation is briefly as follows: The circuit has a stable condition in which section B of $V_{13}$ is conducting and section A is cut off, the voltage drop across resistor 24 being sufficient for this purpose. When a positive synchronizing pulse from the radar system, of sufficient magnitude to drive the control grid of section A above cut-off potential, is applied to this grid, section A begins to conduct lowering its anode potential and also the grid potential of section B due to the fact that the two electrodes are coupled through condenser $C_1$ which cannot alter its charge immediately. The reduction in current of section B reduces the drop across resistor 24 which aids in raising the grid potential of section A, tending to increase its current still further and thereby resulting in a still further reduced grid potential and current in section B. In other words, a regenerative condition exists which causes the transition from the original stable condition to one in which section A is conducting and section B is cut off to take place very rapidly. After this transition has taken place, condenser $C_1$ begins to discharge through resistors $R_1$ and $R_2$, thus raising the grid potential of section B toward the cut-off point. When this point is reached, section B begins to conduct and, through regenerative action similar to that just described, the current in section B rapidly reaches its maximum value and section A is cut-off. The multivibrator has now returned to its original stable condition and will remain in this condition until triggered by another positive synchronizing pulse.

In going through the above described cycle, the multivibrator produces a negative pulse at the plate of section A and at the same time a positive pulse at the plate of section B. The duration of these pulses is determined by the time constant of the circuit containing $C_1$, $R_1$ and $R_2$ and by the setting of potentiometer 25. Since $C_1$, $R_1$ and $R_2$ are fixed quantities, the pulse width is controlled by adjustment of potentiometer 25. The process by which this adjustment affects pulse width is as follows: Resistors 26, 25 and 27 are connected in series from a positive source of potential to ground and comprise a potentiometer for applying, by means of the variable tap on resistor 25, an adjustable positive potential to the grid of section A. The potential between the cathode and grid of section A is the sum of the fixed bias from potentiometer 25 and the voltage drop across resistor 24 produced by the space current of that section (section B being cut off when section A is conductive). After section A is made conductive by the application of a positive triggering pulse, the space current adjusts itself to a stable value such that the voltage drop across resistor 24, when added to the fixed bias from potentiometer 25, produces a potential difference between cathode and grid of the proper value to maintain the said space current. The stable value of space current, and therefore the stable value of cathode potential, can be changed by changing the fixed positive potential applied to the grid from potentiometer 25. The cathode potential tends to follow the grid potential so that if potentiometer 25 is adjusted upward, the cathode potential is raised and if adjusted downward, the cathode potential is lowered. Since the cathodes of the two sections are connected together, the setting of potentiometer 25 likewise determines the potential of the cathode of section B. The setting of this potentiometer therefore determines the length of the pulse since the potential of the cathode in section B is a factor in determining the time required for the grid to reach cut-off potential due to the discharging of condenser $C_1$. The higher the cathode potential, the lower the voltage to which condenser $C_1$ must discharge in order for section B to become conductive.

The operation of the gate multivibrator employing tube $V_{14}$ is identical to the operation of the delay multivibrator, the duration of the gate being determined by the setting of potentiometer 28. The time that elapses between the occurrence of the synchronizing pulse and the occurrence of the gate is determined by the length of the pulse produced by the delay multivibrator. The negative pulse from the anode of section A of $V_{13}$ is used, and is applied to the differentiating circuit 29—30 which converts the trailing edge into a sharp positive pulse for triggering the gate multivibrator. In this way, by adjusting potentiometer 25, the gate may be made to coincide with any desired echo pulse.

The positive output pulse of tube $V_7$, having an amplitude proportional to range, is applied to integrator tube $V_8$. This tube operates as a cathode follower and the time constant of the load circuit, resistor 31 and condenser 32, is such that a substantially continuous direct voltage is produced thereacross which is proportional to the peak values of the pulses applied to the input. This potential is applied directly to the grid of the left hand section of $V_9$ which acts as a D. C. amplifier. The grid bias of this section with no input signal is adjusted to cut-off by means of potentiometer 33. A D. C. milliammeter 10 is connected in the space current path of this section and may be calibrated to read range directly. The anode of the D. C. amplifier is coupled to the control grid of $V_{11}$ through differentiating circuit 35—36. The voltage applied to the grid of $V_{11}$ is therefore proportional to the rate of change of the voltage on the anode of $V_9$ (left hand section) which is in turn proportional to range; thus the voltage on the grid of $V_{11}$ is proportional to the rate of change of range or the relative speed of the target. This voltage will be zero if the range is constant, positive if the range is decreasing (target approaching) and negative if the range is increasing (target receding); whereas the amplitude, either positive or negative, is proportional to the speed. A suitable D. C. voltmeter 12, capable of deflecting either way from zero, may be connected between the grid of $V_{11}$ and ground and calibrated to read speed directly.

The gating voltage, obtained from the grid of the right hand section of $V_6$ and amplified and inverted by the right hand section of $V_9$, is also applied to the grid of $V_{11}$. This tube is biased, by potentiometer 37, beyond cut-off by an amount exceeding the maximum possible differentiated input to the control grid. The positive gating voltage input to $V_{11}$ is adjusted to a value giving any convenient pulse output across the plate load. The output of tube $V_{11}$ is a negative pedestal of the same duration as the gate and having an amplitude proportional to the differentiated voltage applied to the grid; the amplitude of the pedestal is therefore proportional to speed.

Tube $V_{12}$ is a double triode having the anodes of the two sections connected together and also the cathodes. The speed indicating pedestal from $V_{11}$ is applied to the grid of the right hand section of $V_{12}$. Limited echo pulses from the plate circuit of limiter $V_3$ are reversed in phase by inverter $V_{15}$ and applied to the grid of the other section. The output of tube $V_{12}$ therefore is a series of positive limited echo pulses and a speed indicating pedestal which may be moved into coincidence with any of the echo pulses and which indicates the relative speed of the selected target and whether the target is approaching or receding as already described in connection with Figs. 1 and 2.

We claim:

1. In a conventional radar system having means for repeatedly radiating short pulses of energy and means for receiving reflected pulses, and also having means for generating a voltage varying linearly with time and initiated at the time of each radiated pulse, a speed indicating circuit comprising limiting means for converting all received reflected pulses to pulses of the same amplitude, means for combining said linearly varying voltage and said limited pulses to produce pulses having amplitudes proportional to range, means for selecting the range pulses corresponding to a particular reflecting object, means for integrating said selected range pulses to produce a direct voltage proportional to the peak values thereof, and means for differentiating said direct voltage to produce a voltage proportional to the rate of change thereof.

2. In a conventional radar system having means for repeatedly radiating short pulses of energy and means for receiving reflected pulses from various targets, and also having means for generating a voltage varying linearly with time and initiated at the time of each radiated pulse, a range and speed indicating circuit comprising limiting means for converting all received reflected pulses to pulses having the same amplitude regardless of their amplitudes when received, means for combining said linearly varying voltage and said limited pulses to produce pulses having amplitudes proportional to range, means for selecting the range pulses representing a desired target, means for integrating said selected pulses to produce a direct voltage proportional to the range of said target, and means for differentiating said last named voltage to produce a voltage proportional to the relative speed of the target.

3. In a conventional radar system having means for repeatedly radiating short pulses of energy and means for receiving reflected pulses from various targets, and also having means for generating a voltage varying linearly with time and initiated at the time of each radiated pulse, a range and speed indicating circuit comprising limiting means for converting all received pulses to pulses having the same amplitude regardless of their amplitudes when received, means for combining said linearly varying voltage and said limited pulses to produce pulses having amplitudes proportional to range, means including gate producing means and a gated amplifier for selecting the range pulses representing a desired target, means for integrating said selected pulses to produce a direct voltage proportional to the range of said target, means for differentiating said last named voltage to produce a voltage proportional to the relative speed of the target, a second gated amplifier, means for applying a gating voltage from said gate producing means to said second gated amplifier, also means for applying said speed voltage to said second gated amplifier whereby the output of this amplifier is a pedestal of the same duration as the gate and having a height that varies from a fixed height determined by the amplitude of said gate in accordance with the speed of the target, and mixing means for combining the speed indicating pedestal and the pulses from the output circuit of said limiting means.

References Cited in the file of this patent

UNITED STATES PATENTS

| | | |
|---|---|---|
| 2,268,587 | Guanella | Jan. 6, 1942 |
| 2,407,000 | Evans | Sept. 3, 1946 |
| 2,408,742 | Eaton | Oct. 8, 1946 |
| 2,416,088 | Deerhake | Feb. 18, 1947 |
| 2,423,023 | Hershberger | June 24, 1947 |
| 2,423,644 | Evans | July 8, 1947 |